Figures 1, 2:
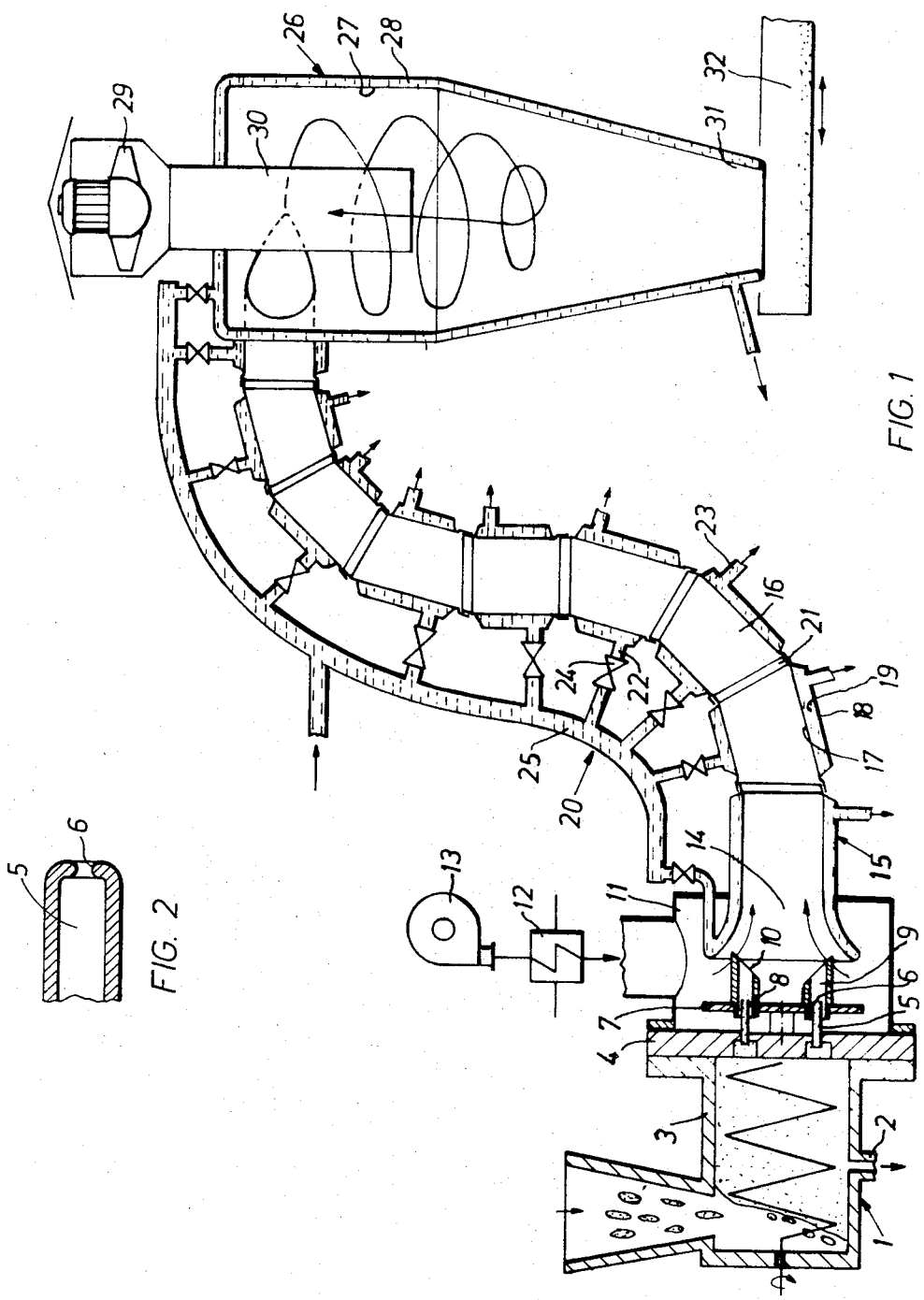

United States Patent [19]
Kuntz et al.

[11] 3,778,907
[45] Dec. 18, 1973

[54] DRYING OF MOIST MATERIAL

[75] Inventors: Egon Kuntz; Paul Esser; Edgar Muschelknautz, all of Leverkusen; Heinz Grone, Marl, all of Germany

[73] Assignee: Bayer Aktiengesellshaft, Leverkusen, Germany

[22] Filed: May 24, 1971

[21] Appl. No.: 146,374

[30] Foreign Application Priority Data
June 11, 1970 Germany.................. P 20 28 742.7

[52] U.S. Cl................................ 34/57 R, 302/64
[51] Int. Cl......................................... F26b 17/10
[58] Field of Search............... 34/10, 57 R; 302/64; 137/13

[56] References Cited
UNITED STATES PATENTS
3,464,121   9/1969   Fukada et al............................ 34/10
3,370,358   2/1968   Esser et al............................. 34/10
3,280,472   10/1966  Lorenian.............................. 34/10
3,265,445   8/1966   Cronin................................ 302/64

Primary Examiner—William F. O'Dea
Assistant Examiner—William C. Anderson
Attorney—Burgess, Dinklage & Sprung

[57] ABSTRACT

Drying of moist material, e.g., rubber crumbs, is effected using a screw machine which disperses the particles in an air stream. The air stream and particles pass through a conveying pipe, in which further drying occurs, and then into a separator from which the dried particles fall onto a conveyor. The conveying pipe and the separator are cooled. The cooling prevents accumulation of the particles on the walls of the equipment.

10 Claims, 2 Drawing Figures

PATENTED DEC 18 1973 3,778,907

INVENTORS:
EGON KUNTZ, PAUL ESSER, EDGAR MUSCHELKNAUTZ, HEINZ GRÜNE.
BY

DRYING OF MOIST MATERIAL

BACKGROUND

The present invention relates to an apparatus and a process for drying, e.g., rubber masses. The apparatus may comprise an expansion screw machine with a nozzle plate having outwardly extended nozzles and a conveyor pipe which operates by conveying air and which is coaxial with and spaced a small distance from the screw machine to receive the extruded particles. The conveyor pipe opens into a separator.

When using screw machines for drying synthetic rubber, the water content of the latter, which is initially about 50 percent, is mechanically reduced in a dewatering screw to from 6 to 15 percent. Of the water which remains, about half is driven off at higher pressure, also mechanically, in a second expansion screw machine which can be combined with the first, and the remainder is evaporated by the so-called expansion method. For this purpose, the moist mass in the second expansion screw machine is brought to a pressure of 30 to 100 atm. and a temperature of 150° to 230°C. and expanded through narrow nozzles. The water occluded in the rubber is largely and explosively evaporated by this expansion. The rubber is consequently broken up into small crumbs of sponge-like form and cooled by the evaporating water to about 100°C. In one known process and apparatus, the rubber particles formed downstream of the nozzles are collected in a relatively large chamber which is arranged beyond the nozzle plate and above a vibratory conveyor. The particles then drop on to the conveyor and are if necessary transported to a weighing arrangement and bale press. Hot air is blown into the chamber to take up and carry away the water vapor. Residence times from 2 to 3 minutes are necessary on the conveyor system, which is partially heated, so that the residual water content of about 1 to 1.5 percent attached to the rubber crumbs is vaporised and the rubber can cool to about 60°C. When pressed into bales and ready for delivery the rubber must generally not contain altogether more than about 0.5 percent of water and other liquid constituents.

The heating of the moist mass in the second screw machine is largely effected by the friction accompanying the extrusion, though some heat can also be supplied through the wall. The water expressed mechanically in that machine can flow out rearwardly or through bores in the wall of the screw cylinder. Part of the water, however, is entrained in relatively large water pockets and bubbles, as inclusions in the rubber material. This water is forced out through the nozzles. At the low temperature of 150° to 200°C., only a small part of this water can evaporate in the screw machine. It is therefore either blown out of the nozzles in finely atomised form or in the most unfavorable cases discharges intermittently as a jet.

Consequently, as experience shows, the nozzles always operate very irregularly. When using a nozzle plate with many separate nozzles, rubber crumbs, steam and water droplets are blown at high velocity out of most of the nozzles. Occasionally only water and steam discharge, also at high velocity, and occasionally constantly thick, relatively long rubber sponge-like strings are expressed slowly from one or more nozzles. The size of the majority of the crumbs is approximately the same as the size of the nozzle apertures which are about 2 to 8 mm. diameter, (where cruciform nozzles are used these have corresponding passage areas), or the crumbs are expanded by the steam up to about twice the size of the nozzle cross-section. An appreciable proportion, which from experience becomes larger with increasing throughput and rising temperature in the expansion screw machine, consists of smaller particles down to approximately the size of 1 mm., and a generally very small proportion of dust-like particles with a grain size below approximately 0.1 mm.

In the chamber arranged after the nozzle plate, most of the crumbs strike the chamber walls. The larger crumbs are thrown back and fall downwardly, while the finer dust-like particles adhere firmly to the wall. They then coalesce into firmly adhering thick coatings which have to be removed manually at short intervals. The air injected into the chamber carries with it a large part of the fine crumbs and the dust-like fraction on leaving the chamber. As a consequence, thick deposits are likewise formed in the suction means, and these deposits have to be removed at intervals. These deposits can constitute up to 5 percent of the total throughput. They are usually still so moist that they have to be separated out, cut and dried again. When water discharges from some nozzles, this comes into contact with the deposits on the wall, and may also become included in the layer of rubber crumbs having a thickness of usually 5 to 10 cm., on the following vibratory conveyor. Such inclusions of water are clearly visible in the finally pressed rubber bales. In unfavorable circumstances, up to 10 percent of all bales comprise water inclusions or inclusions of excessively moist rubber, and these have to be sorted out and worked up once again.

Despite these difficulties, expansion drying has the advantages by comparison with the conventional belt drying, particularly because of lower capital outlay and operational costs.

Rubber can also be dried by evaporating the water inside a screw machine. For this purpose, it is necessary to use twinshaft machines with an evaporation dome. The dome is usually connected to a vacuum pump, so that the water can be evaporated at relatively low temperature. These arrangements are less efficient, are substantially more costly and more subject to mechanical breakdown. Furthermore, the labor costs are greater than with the machines which are used in the expansion drying. The rubber in the last section of the twin-shift machines is already dry and is subjected in an unfavorable way to more severe mechanical stresses than the moist mass in the expansion screw machine. It is also very difficult to keep the wall of the expansion dome free from deposits. Rubber adhering to the hot wall of the expansion dome is quickly degraded. It often happens that such deposits on the wall become detached as lengths of rubber which are drawn into the screw and included in the finished rubber. Such inclusions can completely spoil the finished rubber and are especially annoying because often they can only be detected during subsequent processing.

According to another proposal (German Pat. Specification 1,232,340; British Pat. 1,037,125), an apparatus is described for collecting and redrying rubber crumbs following the dehydration and drying of the rubber mass in a screw press which screw press comprises a liquid outlet, which has a conveyor pipe and a cyclone separator with an open outlet point for the material. The rubber passes from the screw press nozzles into a short tube which increases and then decreases in diameter, and then joins the conveyor pipe. Air enters the short tube through an annular opening between the nozzle plate and the inlet end of the short tube.

Furthermore, another procedure for the final drying of rubber crumbs is described in German Pat. Specification 1,262,574 (U.S. Pat. 3,370,358), which comprises a screw press with a feed inlet and a liquid outlet. It is equipped with a nozzle plate. Following the nozzle plate is an annular array of nozzles and a water cooled tubular member discharging into a conveyor pipe. This is connected to a cyclone separator.

The disadvantages of the apparatus described earlier also occur with the two last-mentioned types of apparatus.

Nevertheless, when brief heating to 150° to 200°C. is permissible with the rubber being processed, it is most preferable least expensive and simplest to dry rubber with the expansion screw machines, and the disadvantages indicated above are accepted.

THE INVENTION

It is the object of the present invention so to improve the expansion drying procedure by means of a suitable apparatus characterized in that the rubber can be thereby separated quickly from steam and the water droplets without sticking or depositing of rubber on the walls.

This object is achieved according to the invention by providing the conveyor pipe and preferably also the separator with cooling means. Another improvement of the invention is a heatshielding plate spaced from the nozzle plate, the extended nozzles projecting through the said shielding plate.

The apparatus according to the invention does not involve any greater expense for equipment than the known processes. An uninterrupted and continuous operation over long periods of time is ensured by the cooling of the conveyor pipe. Cleaning of the apparatus after it has been operating for a short time is not necessary as it has been in the past. The rubber can no longer be spoiled by water inclusions or scorched rubber particles. Despite the cooling of the conveyor pipe and the separator, e.g., a cyclone, sufficient water and steam is removed, so that a brief subsequent drying on a vibrator conveyor is sufficient, the natural heat of the rubber generally being adequate.

Finally, the heat-shielding plate prevents the inlet to the conveyor pipe from being heated up, by screening the radiation of the large nozzle plate.

A very thin water film consisting of condensing water vapor is preferably formed on the cooled wall, and this film substantially completely prevents the formation of deposits due to adhesion of the extremely fine particles, which is almost unavoidable on dry pipe walls. Contrary to all expectations, the cooling of the wall and the associated production of the very thin film of water does not cause any raising of the final moisture content of the rubber after leaving the cyclone, because obviously the water quantities transferred with the impact of the particles are microscopically small and vaporise again in an extremely short time on the surface of the rubber particles.

The temperature of the material issuing from the nozzles can be about 100° to 150°C. and depends upon the kind of the treated material. With intensive cooling, using a coolant at from −15°C to +25°C., it is possible to keep the walls of the conveyor pipe and the cyclone moist and thus clean, even with air temperatures above 100°C. The inlet air temperature can be about 50° to 120°C. The air velocity in the pipe may be, for example, in the range of about 30 to 100 m/s, so that the small rubber particles with a size of about 1 to 0.1 mm. are accelerated practically to the velocity of this air stream, while the velocity of the larger particles remains far below this level. Consequently, the smaller particles must constantly overtake the larger particles. When they fly past the larger particles, they are partially added to the latter, and with repitition of the operation, substantially all the smaller particles are added to the larger particles. The proportion of dust-like rubber particles is thereby so greatly reduced that an almost complete separation in the separator is successfully achieved. In consequence, although cooling of the immersion pipe of the cyclone separator is possible, it is not absolutely necessary.

The cyclone wall can in many cases also be protected by a covering consisting of polytetrafluoroethylene or by another repellent lining, which may, for example, be based on silicone, and can additionally be cooled. By choosing an air temperature for the air entering the conveyor pipe, in the range from about 50°C. to 125°C., and by suitable choice of the coolant temperature and coolant throughput, it is possible reliably to take up, convey and separate in a cyclone practically all existing types of rubber, rubber-like material, both natural and synthetic, with the water content at the outlet of the cyclone separator being at about 1 percent. This means that a residence time in the range of minutes on the following vibratory conveyor is sufficient for the final and subsequent drying.

The method and apparatus of this invention is well suited to the drying of rubbers especially of synthetic rubbers. In more detail, such synthetic rubbers include rubbery solution or emulsion polymers and copolymers of conjugated diene preferably of dienes having 4 to 8 carbon atoms such as butadiene, isoprene, choloroprene and piperylene. Also included are copolymers of such dienes and monoolefinically unsaturated copolymerisable compounds, such as monovinyl aromatic compound, e.g. styrene and aliphatic monovinyl compounds, such as acrylonitrile, alkylacrylates and methacrylates (alkyl having preferably one to six carbon atoms) and copolymers of different conjugated dienes, such as butadiene, isoprene copolymers.

An especially preferred class of rubbers are those having a predominant part of their C=C double bonds in one steric configuration. In the case of polydiene rubbers the predominant configuration is the cis-configuration. Predominant means preferably more than 35% and most preferably more than 70% of all C=C double bonds present. Examples of such diene rubbers are 1,4-cis-polybutadien (cis-content preferably 35 to 98%) and 1,4-cis-polyisoprene (cis-content preferably 50 to 98% of all double bonds).

Another class of synthetic rubbers are ethylene, propylene co- and terpolymers. In these rubbers ethylene and propylene moieties are present in a molar ratio of 80:20 to 20:80. As third constituent (tercomponent) a number of nonconjugated diolefins can be present in an amount of up to approximately 50 % by weight based on the total of the monomer units. Examples of such tercomponents are 1,4-hexadiene, ethylidene-norbornene, dicyclopentadiene, etc.

Still other preferred rubbers are polyalkenamers meaning rubber-like products obtained by ring opening polymerisation of cyclic monoolefins. The most well known products of this class are polypentenamers. These products may have the double bonds preferably in cis- or preferably in transconfiguration. All such products are suitable. The term "polyalkenamers" as used in this context is understood to comprise also copolymers of cyclic monooleins, e.g. cyclopentene and other copolymerisable monomers, e.g. butene, and butadiene.

In the present invention pure rubbers as well as conventional blends of rubbers and rubber extending oils for fillers and pigments can be processed.

In a particularly advantageous embodiment of the apparatus according to the invention, the cooling means of the conveyor pipe consist of individual annular chambers connected for coolant flow in parallel and arranged one after the other. This construction is of particular value with types of rubber which are difficult to handle, and in connection with the flow properties of the apparatus. By subdividing the cooling system into a plurality of cooling chambers which can be charged with coolant independently of one another, it is possible when necessary to selectively vary the cooling action along the conveyor pipe and the separator.

Construction of conveyor pipe which has proved desirable comprises separate short ring sections each having a double wall which together define an annular chamber, the outer wall always being united in a sealing manner to the inner wall at the ends of the ring sections, while the annular chamber is provided with coolant supply connections and discharge connections and the inner wall is formed at its ends as a push-in connection.

This construction permits the conveyor pipe to be rapidly installed and permits damaged ring sections to be rapidly replaced when necessary.

The annular chambers are advantageously connected to a common coolant supply pipe by way of supply connections, in each of which is arranged a flow control valve. The flow control valves permit accurate measurement of the coolant for each separate annular chamber. When large operational fluctuations are to be expected, measuring instruments are advantageously installed on the separate annular chambers of the conveyor pipe, these instruments measuring the temperature and automatically operating associated control valves through a control mechanism in order to produce the best possible cooling action.

The bores of the extended nozzles of the extruder preferably have a constriction at their outlet end. The bore can be about 5 to 10 mm diameter and the outlet end can be about 2 to 8 mm diameter. If the form of the passageways is other than circular, the cross-sectional flow areas can be as is indicated by the diameter dimensions given. This enables a better crumb formation of the discharging rubber mass to be obtained.

The distance between the heat-shielding plate and nozzle plate is advantageously 1 to 5 cm. and the extended nozzles project a further 2 to 5 cm. from the heat-shielding plate. These dimensions have proved to be advantageous as regards the flow conditions of the heated conveying air and the heat-protection effect of the shielding plate.

In another, particularly advantageous development of the apparatus according to the invention, the nozzles are enclosed by concentric protective or confining tubes, which pass through the heat-shielding plate and are open at the rear end.

When employing the usual short nozzles, some of the rubber is in fact broken up by the steam only after leaving the nozzles. As a consequence, particles are thrown in all directions and even rearwardly towards the nozzle plate. By using protective tubes according to the invention, arranged with a spacing of a few millimetres concentrically around the nozzles, the conveying air flows from the space between the heat-shielding plate and nozzle plate, in a manner similar to that found with an injector, and with high velocity axially through the annular gaps between the protective tubes and extended nozzles and carries with it at high velocity in the axial direction those particles which are flying sideways. This has the particular effect of completely preventing the extremely fine particles contacting the wall and thus prevents deposits forming in this zone.

This effect is reinforced in accordance with one specific constructional form, in which the protective tubes comprise a bevel at their ends. These bevelled ends advantageously extend beyond the ends of the nozzles.

It has proved to be especially advantageous in this connection for the protective tubes to be so arranged in relation to the extended axis of the worm machine that, as seen from said axis, the longest part of the protective tube is disposed outwardly. This has the effect of keeping practically all particles issuing from the nozzles away from the walls of the inlet end of the following conveyor pipe.

SUMMARY OF THE INVENTION

Thus, the invention provides improvements in apparatus for drying of moist, finely divided polymeric material, which apparatus comprises a mixing means for combining the moist material and a drying air stream, with the moist material entrained in the air stream as a dispersion; a conveying pipe having an inlet end for receiving the dispersion and a discharge end for discharge thereof, for conveying the dispersion while the air dries the material; and a separator receiving the discharge end of the conveying pipe for receiving the dispersion from the conveying pipe and separating the material from the air. The improvement of the invention comprises conveying pipe cooling means for cooling the inner surface of the pipe from the discharge end of the conveying pipe to adjacent the inlet end thereof. Advantageously, means are also provided for cooling the inner surface of the separator. The cooling of the equipment as aforesaid prevents accumulation of material on the surfaces.

The cooling can be by forced circulation of coolant over the outer surfaces. Preferably the cooling provides condensed liquid on the inner surfaces. The condensed liquid can be in the form of a film or films.

Condensed liquid film need not and preferably does not accumulate on the surfaces of the equipment in amounts such that there is any or any significant dripping or flowing of condensate from the surfaces.

Further, the invention provides an improvement in the apparatus for dispersing the moist finely divided polymeric material in a drying air stream. Such apparatus comprises an expansion screw machine having a nozzle plate and a plurality of discharge nozzles mounted in the nozzle plate for discharge therethrough of the material from the expansion screw machine, into the drying air stream. A chamber is provided for receiving and combining material discharge through said nozzles and receiving the drying air stream, and means are provided for supplying air to the chamber. A conveying pipe is mounted with its inlet end communicating with the chamber for receiving the dispersion and conveyance of the dispersion therethrough. According to the invention, a heat shield plate is interposed between the nozzle plate and conveyor pipe inlet, and spaced from the nozzle plate, for shielding the conveyor pipe inlet from heat of the nozzle plate.

EMBODIMENTS

The invention is illustrated in the accompanying drawing, wherein:

FIG. 1 is a diagrammatic drawing of the apparatus for drying according to the invention; and FIG. 2 shows the construction of the discharge nozzles of the screw machine.

An expansion screw machine 1 is provided with a liquid outlet 2 in the housing wall 3 and carries at the outlet end a nozzle plate 4 having extended nozzles 5. The outlets of the nozzles are constricted at 6 (FIG. 2). The nozzles project through a heat-shielding plate 7 and are enclosed by concentric protective or confining tubes 9 which are bevelled at 10 and leave an annular gap 8 between the nozzles 5 and protective tubes 9. A chamber 11 is attached to the nozzle plate 4, being connected by way of an air heater 12 to a fan 13 for delivery air. The inlet end 14 of a cylindrical conveying pipe 15 projects into the cylindrical chamber 11 facing the nozzles 5.

The conveying pipe 15 is built up from individual ring sections 16, each of which consists of a double wall 17 and 18, the inner wall 17 forming the actual conveyor pipe and the jackets or outer wall 18 serving to form an annular chamber 19, which is part of a cooling arrangement 20. The ring sections 16 are joined to one another by push-in connections 21 whereby adjacent ends of adjoining sections 16 are telescoped together. The annular chambers 19 are provided with inlet pipes 22 and discharge pipes 23. The inlet pipes 22 are outfitted with a throughput control valve 24 and are connected to a common supply pipe 25.

The conveyor pipe 15 finally opens into a cylindrical cyclone separator 26, the wall 27 of which is also cooled by means of a jacket or annular chamber 28. A suction fan 29 provides for the exhaustion of the conveyor air through the immersion pipe 30. The rubber crumbs leave the cyclone separator 16 through its lower outlet 31 and are carried away by means of a vibratory conveyor 32.

The operation of the apparatus according to the invention and as described above is explained by reference to one particular example.

2,500 kg per hour of poly-cis-1,4-polybutadiene crumbs which have been reduced to a water content of about 12 percent in a first dewatering screw machine in the conventional manner, are brought to 170°C. and 50 atm. in the expansion screw machine 1 having a screw diameter of 10 inches and a driving means of 300 h.p. and expanded through 12 nozzles 5 of the construction shown in FIG. 2, having a 8 mm. bore and an outlet end diameter of 5 mm. The nozzles project 80 mm. beyond the nozzle plate 4. 140 litres per hour of expressed water are discharged at the liquid outlet 2 of the worm machine 1. The conveying pipe 15 has a length of 10 metres and a diameter of 175 mm. and is arranged with a spacing of 150 mm. from the nozzle plate 4. The heat-shielding plate 7 has a wall thickness of 5 mm. and is arranged at a distance of 20 mm. from the nozzle plate 4. The nozzles have an external diameter of 18 mm. and the protective tubes 9 have an internal diameter of 20 mm.

4,000 cubic metres per hour of air are supplied at a temperature of 75°C. by the blower or fan 13 and by way of the heater 12, this air being blown at a velocity of 45 m/s through the conveying pipe 15. About 2 ½ cubic metres per hour of water flow through the coolant supply pipe 25, the water having an inlet temperature of 12°C. and an outlet temperature of 25°C. The water flows through the cooling system 20 of the conveyor pipe 15 and the cooling system 28 of the cyclone separator 26. From the nozzles 5, crumbs with a size of from 0.1 to about 5 mm. are blown out at velocities up to 40 m/s, together with steam and droplets of water with a size below 1 mm. In extreme cases strings of rubber which are apertured in sponge-like form, with a diameter of from 5 to 10 mm. and of a length which can be up to 10 cm., can be slowly extruded at speeds in the region of 1 m/s from some nozzles 5. Also one or two nozzles 5 for a short time can blow out a mixture of water, steam and a few fine rubber particles. From the fan 29 of the cyclone separator 26, about 4,000 cubic metres of air per hour are extracted.

The conveying pipe 15 has two bends, each of 90° and each with a radius of curvature of 150 cm. These bends are each composed of 4 ring sections 16 with a length of 30 cm. The outlet end of the conveyor pipe 15 enlarges with a taper of 10° to a cross sectional area about double that of pipe 15 where it first intersects the separator 26. The cyclone separator is 1 ½ metres in overall height and has a cylindrical upper section of 750 mm. length with a diameter of 750 mm. The separator chamber is conically tapered at an angle of 30° towards the open outlet 31 for the material, which has a diameter of 350 mm. The inwardly projecting immersion tube 30 has a length of 500 mm. and a diameter of 275 mm. The cyclone separator 26 permits about 10 kg/h of dry rubber particles with a size of 0.1 to about 2 mm. to be entrained in the waste air, which is separated in a second cyclone and recycled to the screw machine. The rubber is conveyed on a vibratory conveyor 32 which has a length of 12 m. and a width of 0.5 m. and is lined with "Silopren." The conveying speed is 8 m/min and the rubber is conveyed to a weighing arrangement and bale press. At the outlet 32 from the cyclone, the rubber has a temperature of from 80° to 85°C., and a water content of about 1% while at the end of the vibratory conveyor 32, the temperature is about 60°C. and the water content is at least 0.4 percent. The quantity to be worked up a second time is less than 0.5 percent of the total throughput.

Percentages herein are wt.% unless a different basis is indicated. Flow rates, including volume and velocity rates, are on the basis of the prevailing temperatures and pressures.

What is claimed is:

1. Apparatus for drying of moist finely divided polymeric material comprising:
   a. mixing means for combining the moist material and a drying air stream with the moist material entrained in the air stream as a dispersion,
   b. a conveying pipe having an inlet end for receiving the dispersion and a discharge end for discharge thereof, for conveying the dispersion while the air dries the material, c. a separator receiving the discharge end of the conveying pipe for receiving the dispersion from the conveying pipe and separating the material from the air, d. means jacketing said conveyor pipe from the discharge end thereof substantially the inlet end thereof, for circulation of coolant over the outer surface of the conveyor pipe, coolant inlet means to said jacketing and coolant outlet means from said jacketing, e. said mixing means comprising an expansion screw machine having a nozzle plate and a plurality of discharge nozzles mounted in the nozzle plate for discharge therethrough of the material from the expansion screw machine into the drying air stream, a chamber for receiving and combining material discharged through said nozzles and the drying air stream, means for supplying air to said chamber, the inlet end of the conveyor pipe communicating with said chamber for receiving the dispersion as aforesaid, and a heat shield plate interposed between the nozzle plate and conveyor pipe inlet, and spaced from the nozzle plate, for shielding the conveyor pipe inlet from heat of the nozzle plate.

2. Apparatus according to claim 1, each discharge nozzle having a constriction at its outlet end.

3. Apparatus according to claim 1, the spacing the heat shield plate and the nozzle plate being about 1 to 5 cm., and the discharge nozzles projecting through and about 2 to 5 cm. beyond the heat shielding plate.

4. Apparatus according to claim 1, each discharge nozzle being provided with a confining tube for receiving material discharged from the nozzle and confining dispersion thereof and directing the material toward the conveyor pipe inlet, each confining tube having an inlet end surrounding and spaced from the outlet end of its nozzle and extending to termination in an outlet end disposed downstream of the discharge nozzle, each confining tube and its discharge nozzle defining an annular passageway, each confining tube being open at its inlet end permitting passage of an air stream through said annular passageway.

5. Apparatus according to claim 4, the discharge nozzles and confining tubes being disposed about the axis of nozzle plate, the outlet end of each of the confining tubes being beveled, the radially outwardly disposed portion of the beveled end being disposed adjacent the conveyor pipe inlet, the radially inwardly disposed portion of the beveled end being disposed remote from the conveyor pipe inlet.

6. In apparatus for dispersing moist finely divided polymeric material in a drying air stream for conveyance of the material by the air through a conveyor pipe as a dispersion, comprising:

a. an expansion screw machine having a nozzle plate and a plurality of discharge nozzles mounted in the nozzle plate for discharge therethrough of the material from the expansion screw machine into the drying air stream, b. a chamber for receiving and combining material discharged through said nozzles and the drying air stream, c. means for supplying air to said chamber, d. a conveyor pipe having its inlet end communicating with said chamber for receiving the dispersion and conveyance of the dispersion therethrough, the improvement which comprises:

a heat shield plate interposed between the nozzle plate and conveyor pipe inlet, and spaced from the nozzle plate, for shielding the conveyor pipe inlet from heat of the nozzle plate.

7. Apparatus according to claim 6, each discharge nozzle having a constriction at its outlet end.

8. Apparatus according to claim 6, the spacing the heat shield plate and the nozzle plate being about 1 to 5 cm., and the discharge nozzles projecting through and about 2 to 5 cm. beyond the heat shielding plate.

9. Apparatus according to claim 6, each discahrge nozzle being provided with a confining tube for receiving material discharged from the nozzle and confining dispersion thereof and directing the material toward the conveyor pipe inlet, each confining tube having an inlet end surrounding and spaced from the outlet end of its nozzle and extending to termination in an outlet end disposed downstream of the discharge nozzle, each confining tube and its discharge nozzle defining an annular passageway, each confining tube being open at its inlet end permitting passage of an air stream through said annular passageway.

10. Apparatus according to claim 9, the discharge nozzles and confining tube being disposed about the axis of the nozzle plate, the outlet end of each of the confining tubes being beveled, the radially outwardly disposed portion of the beveled end being disposed adjacent the conveyor pipe inlet, the radially inwardly disposed portion of the beveled end being disposed remote from the conveyor pipe inlet.

* * * * *